US006296983B1

(12) United States Patent
Gula et al.

(10) Patent No.: US 6,296,983 B1
(45) Date of Patent: Oct. 2, 2001

(54) IMAGING ELEMENT WITH IMPROVED TWIST WARP

(75) Inventors: Thaddeus S. Gula, Rochester; Peter T. Aylward, Hilton; Robert P. Bourdelais, Pittsford, all of NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 09/197,361

(22) Filed: Nov. 20, 1998

(51) Int. Cl.[7] .............................. G03C 1/79; G03C 1/93; G03C 1/795; B32B 7/02; B32B 27/10

(52) U.S. Cl. .......................... 430/201; 430/496; 430/533; 430/534; 430/536; 430/538; 430/930; 428/212; 428/481; 428/511; 428/513; 347/106; 503/227

(58) Field of Search .................................... 430/533, 534, 430/536, 538, 930, 201, 496; 347/106; 503/227; 428/511, 513, 481, 212

(56) References Cited

U.S. PATENT DOCUMENTS

| | | | |
|---|---|---|---|
| 5,244,861 | 9/1993 | Campbell et al. | 430/201 |
| 5,389,422 | 2/1995 | Okazaki et al. | 428/141 |
| 5,431,982 | 7/1995 | Nishiyama et al. | 428/141 |
| 5,496,688 | 3/1996 | Okamoto et al. | 430/496 |
| 5,514,460 | 5/1996 | Surman et al. | 428/304.4 |
| 5,853,965 | 12/1998 | Haydock et al. | 430/538 |
| 5,866,282 | 2/1999 | Bourdelais et al. | 430/538 |
| 5,874,205 | 2/1999 | Bourdelais et al. | 430/538 |
| 5,888,643 * | 3/1999 | Aylward et al. | 430/536 |
| 6,030,742 * | 2/2000 | Bourdelais et al. | 430/536 |

FOREIGN PATENT DOCUMENTS

| | | |
|---|---|---|
| 0 183 467 | 6/1986 | (EP) . |
| 0 317 276 A2 | 5/1989 | (EP) . |
| 0 316 081 B1 | 7/1993 | (EP) . |
| 0 880 065 A1 | 11/1998 | (EP) . |
| 0 880 067 A1 | 11/1998 | (EP) . |
| 0 880 069 A1 | 11/1998 | (EP) . |
| 2 325 749 | 12/1998 | (GB) . |
| 2 325 750 | 12/1998 | (GB) . |
| WO 98/02301 | 1/1998 | (WO) . |

* cited by examiner

*Primary Examiner*—Richard L. Schilling
(74) *Attorney, Agent, or Firm*—Paul A. Leipold

(57) ABSTRACT

This invention relates to a photographic element comprising a base paper, and biaxially oriented sheets on each side of said base paper wherein said biaxially oriented sheets and said base paper have the strongest direction of each web within 3 degrees of the machine direction or cross direction, and wherein each web has a machine direction to cross machine direction stiffness ratio of greater than 1.5 or less than 0.7.

23 Claims, 1 Drawing Sheet

IMAGING ELEMENT WITH IMPROVED TWIST WARP

FIELD OF THE INVENTION

This invention relates to printing media. In a preferred form it relates to an improved base for photographic materials.

BACKGROUND OF THE INVENTION

Printing media are improved if they resist curl and remain flat. This is particularly important with media utilized in the formation of images. Such imaging media include ink jet, thermal dye sublimation imaging, thermal wax dye transfer, electrophotography, and silver halide photography. The formation of a flat base is particularly important for color photographic paper. Present color papers will curl during development and storage. Such curl is thought to be caused by the different properties of the layers of the color paper as it is subjected to the developing and drying processes. The layers in prior art photographic papers that influence image curl are cellulose paper and the gelatin emulsion layer. Humidity changes during storage of color photographs lead to curling, as the humidity changes the physical properties of the paper and gelatin emulsion. There are particular problems with color papers when they are subjected to extended high humidity storage such as at greater than 50% relative humidity. Extremely low humidity of less than 20% relative humidity also will cause photographic papers to curl. Curled photographs are undesirable, as they may not be stacked well, displayed on flat surfaces, or displayed in a pleasing manner in albums or when viewed individually. In color papers there is a need for providing color papers with improved resistance to curl.

Color print papers are usually made of three structural layers under the emulsion; cellulose paper base, and a top and bottom coating of extrusion cast polyethylene. Since the strength properties of polyethylene in this form are poor in comparison to the cellulose paper base, the curl properties or the stiffness of a print in bending is determined exclusively by the cellulose paper base. Because of the alignment of the paper fibers during manufacturing, the cellulose paper base is highly oriented with respect to strength properties in the plane of the paper; for example, the ratio of the elastic modulus in the strongest to weakest direction is often 2:1, with the strongest direction in the MD (machine direction). This is why the shape of a typical polyethylene sample with curl, caused by resisting emulsion shrinkage on one surface at low humidity, is cylindrical with the axis of curl along the MD, so the sample curls in its weakest direction, or directly in the CD (cross direction).

Illustrated in FIG. 1 is a photographic image with typical image curl aligned with the MD. Photographic image 10 has curl aligned with the machine direction 14 and perpendicular with the cross direction 12.

The Technical Association of the Pulp and Paper Industry literature suggests that the MD to CD modulus ratio predicts manufacturing efficiency in conversion processes, optimizing bending stiffness, monitors "draws" and the "jet/wire" ratio. An MSA (major strength angle) of a paper web or biaxially oriented polymer sheets is defined as the angle from the machine direction where the modulus of the paper web or biaxially oriented sheet is at its maximum. For example, a paper web with an MSA of 0 degrees has its modulus maximum aligned with the machine direction. A biaxially oriented polymer sheet with a MSA of 10 degrees has its modulus maximum 10 degrees away from the machine direction. The Technical Association of the Pulp and Paper Industry literature suggests that an MSA outside plus or minus 3 degrees predicts "stack lean", dimensional stability, misregistration in printing due to differences in hygroexpansion, baggy edges, and wrinkles. A MSA outside 5 degrees indicates that the paper making head box is out of tune.

Stiffness in the plane of a sheet can be obtained from a Lorentzen & Wettre TSO gauge. This device can draw a polar plot of stiffness, and it is also capable of estimating the major strength angle (MSA) by using sonic waves traveling though a sample in different directions. The sample may be analyzed repeatedly in a MD or CD pattern to map out the range of variation in the MD/CD profile and MSA.

In the absence of a TSO gauge, a tensile test can be done on a group of samples cut at angles from the MD to obtain the polar values. It is necessary to take a large number of samples to be sure that the proper curve shape is obtained. The polar strength of a material can be modeled by the von Mises multimodal distribution equation below:

$$f(A, K, \Theta, \mu) := \frac{A}{\pi \cdot JO(K)} \cdot e^{K \cdot \cos(\Theta - \mu)^2}$$

The parameter A is used to scale the size of the ellipsoid, K is a shape factor used in the term JO(K) which is a Bessel function of the first kind and zero order, Θ is the angle at which the strength is indicated, and $\mu$ is the MSA or major axis offset angle.

For assembled laminates, the polar stiffness data may either be elastic modulus readings or bending stiffness data. The bending stiffness of the sheet can be measured by using the LORENTZEN & WETTRE STIFFNESS TESTER, MODEL 16D. The output from this instrument is the force, in millinewtons, required to bend the cantilevered, unclamped end of a clamped sample 20 mm long and 38.1 mm wide at an angle of 15 degrees from the unloaded position. A typical range of stiffness that is suitable for photographic prints is 120 to 300 millinewtons. A stiffness greater than at least 120 millinewtons is required, as the imaging support begins to lose commercial value below that number. Further, imaging supports with stiffness less than 120 millinewtons are difficult to transport in photographic finishing equipment or ink jet printers causing undesirable jams during transport. Supports with an MD stiffness greater than 280 millinewtons will also require too much force to transport a print around some metal guides because the coefficient of friction times the bending force is too high.

To better manage the curl of the photographic paper, replacing the low strength cast polyethylene layers with high strength biaxially oriented polymer sheets is useful. High strength plastic sheets are commonly made by biaxially orienting coextrusion cast thick (1025 $\mu$m) polyolefins. The sheets in question may be labeled OPP for oriented polypropylene. Biaxially oriented polymer sheets are typically oriented 5X in the MD and then 8X in the CD. The final major strength properties are aligned with the CD and they are generally 1.8 times that of the MD. The MSA for biaxially oriented sheets can be aligned out of the exact CD direction by 10 degrees or more. For most purposes, a biaxially oriented sheet aligned out of the exact CD direction by 10 degrees or more is of no consequence. An MSA of 10 degrees or more is believed to be related to orientation of the polymer first in the CD and then MD direction.

It has been found previously that to minimize curl in an imaging support material, the elastic modulus for high strength biaxially oriented polymer sheets should be the same order of magnitude as the cellulose paper base. High modulus biaxially oriented sheets, therefore, are superior to the weak polyethylene layers coated on prior art support materials. It has also been found that the primary strength axis for the biaxially oriented sheets should be approximately perpendicular to the cellulose paper base because it is possible to select combinations biaxially oriented sheets adhered to the cellulose paper base to obtain a combined bending stiffness that is equal in the MD and CD direction. It has been previously found that equal bending stiffness in the MD and CD tends to minimize image curl.

It has been found that the condition of equal MD and CD strength is not, in itself, sufficient to keep a laminate from having optimum curling properties. Imaging supports made by laminating biaxially oriented sheets to cellulose paper and having a combined bending stiffness that is equal in the MD and CD direction have been shown to have "diagonal curl" which is curl where the axis of the cylinder of curvature is at an angle between the CD and MD. FIG. 2 is an illustration of diagonal curl or twist warp of a photographic image. Photographic image 20 is curled along the diagonal of cross direction 26 and machine direction 24. Diagonal curl, also known as "twist warp", makes the photographic print appear undesirable because the diagonal direction maximizes the total edge lift when the sample is laid on a table and the curl occurs along the line of maximum photo length. Perceptual testing showed that consumers seem to dislike the diagonal curl, even with small amounts of curl. It would be desirable to reduce diagonal curl of a image.

PROBLEM TO BE SOLVED BY THE INVENTION

There remains a need for a base substrate for printing and for photographic use that will resist curl and maintain printed images flat after processing and in storage. There is a particular need for laminated substrates that resist changes in planar orientation during humidity change and do not exhibit "twist warp".

SUMMARY OF THE INVENTION

It is an object of the invention to provide improved printing materials with minimal twist warp.

It is another object of the invention to provide printing materials that have resistance to curl during humidity change.

A further object is to provide color photographic elements that will not curl significantly under ordinary use and storage.

Another object is to provide color photographic elements that do not exhibit significant twist warp.

These and other objects of the invention are generally accomplished by providing a photographic element comprising a base paper and biaxially oriented sheets on each side of said base paper wherein said biaxially oriented sheets and said base paper have the strongest direction of each web within 3 degrees of the machine direction or cross direction, and wherein each web has a machine direction to cross machine direction stiffness ratio of greater than 1.5 or less than 0.7.

ADVANTAGEOUS EFFECT OF THE INVENTION

The invention provides improved imaging elements that resist curling under a variety of conditions. It particularly provides color photographic elements that are resistant to curl and lie flat under a variety of humidity conditions.

DETAILED DESCRIPTION OF THE INVENTION

Figure 1:
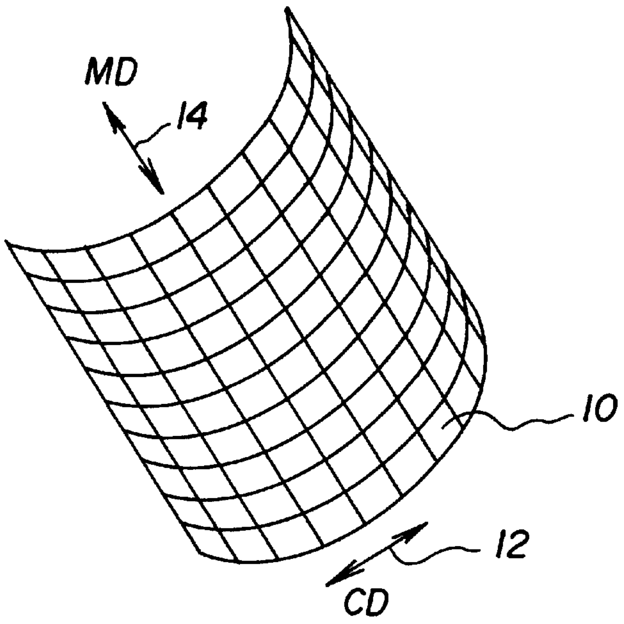
FIG. 1 is an illustration of typical image curl aligned with the MD for a photographic image.
Figure 2:
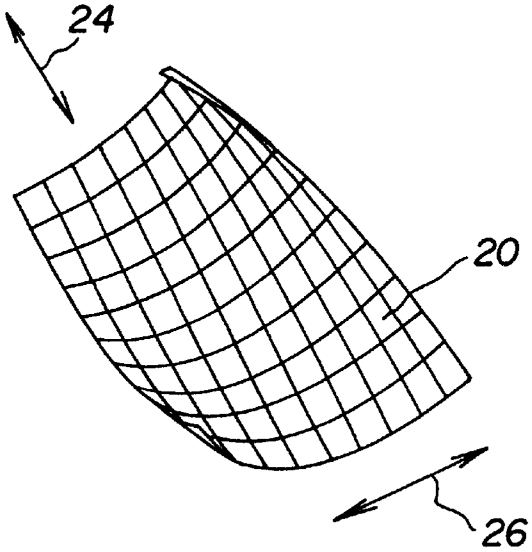
FIG. 2 is an illustration of diagonal curl or twist warp of a photographic image.

The invention has numerous advantages over prior practices in the art. The imaging members of the invention may be thin, as the balancing of image curl forces uses thin, strong polymer layers. Prior practices utilized thick substrates in an effort to avoid curl, whereas the invention achieves this in relatively thin photographic members. The imaging members of the invention are more pleasing to the viewer of the image, as the image is flat and, therefore, does not have undesirable reflections and distortions caused by viewing of a curled image. The imaging material of the invention further has the advantage that it is easier to process as curling does not occur. Curling can lead to transport difficulties and jamming of the machines required for developing, transporting, and packaging of image material. The photographic paper, if curled during the imaging step, will result in distorted and out of focus images. The laminated imaging base in this invention also has an advantage in the easier feeding of image base material into printers of the electrophotographic, thermal dye transfer, and ink jet printers. Another advantage of the microvoided sheets of the invention is that they are more opaque than titanium dioxide loaded polyethylene of present products. They achieve this opacity partly by the use of the voids, as well as the improved concentration of titanium dioxide at the surface of the sheet. The photographic elements of this invention are more scratch resistant, as the oriented polymer sheet on the back of the photographic element resists scratching and other damage more readily than polyethylene. These and other advantages will be apparent from the detailed description below.

The invention is accomplished by providing a biaxially oriented sheet on each side of a base paper to form a laminated base. These biaxially oriented sheets on the top and bottom of the base paper are chosen such that they, together with the base paper itself, resist bending under a variety of humidity conditions. Paper base materials generally have a tendency to bend in the direction crossways to the machine direction such that they, in an extreme case, would form a trough in the machine direction. The reason the paper tends to bend like that is that it is stronger in the machine direction than in the cross direction. The polymer sheets are selected to oppose this tendency of the base paper to bend.

Biaxially oriented sheets are particularly suitable for resisting bending of the base paper, as they may be engineered during their formation to have selected properties in both the machine and cross direction. This is a result of their being stretched in both directions during formation. For instance, greater stretching in the cross direction during formation of a biaxially oriented sheet will result in a sheet that is stronger in the cross machine direction. Such a polymer sheet, when combined with paper that is weaker in the cross direction, will form a sheet with combined forces that have a strong tendency to keep the laminated sheet flat.

When the biaxially oriented sheets are laminated to the base materials, the biaxially oriented sheets and base paper preferably have the strongest direction of each web within 3 degrees of the machine direction or cross direction, and wherein each web has a machine direction to cross machine direction stiffness ratio of greater than 1.5 or less than 0.7. An MSA greater than 4 degrees for the cellulose paper base or the biaxially oriented polymer sheets will cause an image to exhibit undesirable diagonal curl.

The onset of diagonal curl has been found to be related to the modulus and MSA of each biaxially oriented sheet in the composite support structure. A math model was made to predict the combinations of properties that would cause an uneven polar strength diagram. The model to predict polar bending stiffness used these assumptions:

a. A von Mises elastic modulus model for each structural member of the laminate can be constructed to be used to vary the elastic modulus and MSA for each component.

b. Each member is weighted for its contribution in a stiffness model. This is done by calculating the moment of inertia referenced to the center of bending times modulus for each. In this way, the stiffness effects can be added to produce the total laminate polar stiffness.

c. Normal variance in the point to point modulus is included at a standard deviation of 5% so that a statistical estimate of point to point stiffness is achieved. This shows the realistic stiffness differences that are needed to allow a sample to curl in a unique direction.

d. The raw base, face, and wire laminates MD to CD ratios are input and held constant since they typically remain constant.

f. The main input to the model is the MSA for each component, which has been found to be the primary control for twist warp, assuming the thickness and types of components have been chosen.

The output from the model is the combined polar stiffness plot of the whole laminate. The radial locations at approximately 50 and 130 degrees from the MD are examined; if they represent the weakest directions, curl would most likely occur towards that angle on the print, and the axis of the cylinder of curl would be perpendicular to that angle.

The stiffness model including a top biaxially oriented sheet, cellulose paper base, and two bonding layers was run to simulate a variety of samples and observe whether or not there was a distinct off axis curl direction by plotting the histograms of the 50 and 130 degree stiffness. A statistical comparison of the two histograms was used to decide when the sample would yield a unique curl direction. The results showed that:

a. The rotation of the MSA can be positive or negative. The worst case is when the raw base is opposite to both the top and bottom biaxially oriented polymer sheets.

b. The probability of a unique, objectionable diagonal curl direction becomes high when any of the singular MSA numbers are off by greater than 4 degrees. The MSA angle for OPP materials is known to have a predictable value for its CD location in the much wider product roll it was slit from.

In order to form balanced laminated imaging support that will be flat, it is necessary to accurately measure the properties of the base paper and candidate biaxially oriented sheets with respect to their tendency to deflect under load. This is done by measuring the Young's modulus of the sheets of biaxially oriented film and the base paper in at least the machine and cross direction. This measurement is done by determining the stress-strain curve for each material. This testing is ordinarily done by use of an Instron tensile tester. These tests for paper are run at a variety of humidity, as the paper properties change with humidity.

After the properties of the base paper and biaxially oriented sheets have been determined, there is selected a base paper and films that will have balanced forces to resist curl. This selection process is generally carried out by mathematical modeling. For the purposes of math modeling, where the support structure is relatively balanced on each side, the center of bending is assumed to be at the geometric center of the package, and the contribution of each distinct layer to bending stiffness is calculated from the modulus times the moment of inertia of a unit cross section. In the case of unbalanced support structure, where the center of bending is not known or where an extremely accurate solution is required for nonlinear materials, nonlinear finite element analysis can be used.

In the formation of photographic papers, a further factor to consider in formation of a curl resistant product is the properties of the gelatin emulsion imaging layers that are placed onto the paper. The emulsion layers apply forces to the paper as they expand and shrink in response to humidity changes. The emulsion forces are also considered in order to create a laminated base that will resist curl the best at a variety of humidity conditions. The emulsion, as it dried after formation, shrinks tending to curl the paper bearing the emulsion layer inward, particularly at normal usage conditions at low humidity. The laminated base papers of the invention are designed when used as a photographic base to be practically flat under conditions where an emulsion is present on the surface.

For laminated photographic base materials for use in photographic papers, any suitable combination of base paper and biaxially oriented film properties may be utilized. The preferred biaxially oriented sheets for use in laminated paper substrate have a Young's modulus in the machine direction of between 690 MPa and 5520 MPa. The Young's modulus in the cross direction is between 690 MPa and 5520 MPa. The base paper preferably has a Young's modulus of 13800 MPa and 2760 MPa in the machine direction and between 6900 MPa and 1380 MPa in the cross direction.

The terms as used herein, "top", "upper", "emulsion side", and "face" mean the side or toward the side of the photographic member bearing the imaging layers. The terms "bottom", "lower side", and "back" mean the side or toward the side of the photographic member opposite from the side bearing the photosensitive imaging layers or developed image.

Any suitable biaxially oriented polyolefin sheet may be utilized for the sheet on the top side of the laminated base of the invention. Microvoided composite biaxially oriented sheets are preferred and are conveniently manufactured by coextrusion of the core and surface layers, followed by biaxial orientation, whereby voids are formed around void-initiating material contained in the core layer. Such composite sheets are disclosed in, for example, U.S. Pat. Nos. 4,377,616; 4,758,462; and 4,632,869.

The core of the preferred composite sheet should be from 15 to 95% of the total thickness of the sheet, preferably from 30 to 85% of the total thickness. The nonvoided skin(s) should thus be from 5 to 85% of the sheet, preferably from 15 to 70% of the thickness.

The density (specific gravity) of the composite sheet, expressed in terms of "percent of solid density" is calculated as follows:

$$\text{Composite Sheet Density/Polymer Density} \times 100 = \text{\% of Solid Density}$$

should be between 45% and 100%, preferably between 67% and 100%. As the percent solid density becomes less than 67%, the composite sheet becomes less manufacturable due to a drop in tensile strength and it becomes more susceptible to physical damage.

The total thickness of the top composite sheet can range from 12 to 100 $\mu$m, preferably from 20 to 70 $\mu$m. Below 20 $\mu$m, the microvoided sheets may not be thick enough to minimize any inherent non-planarity in the support and would be more difficult to manufacture. At thickness higher than 70 $\mu$m, little improvement in either surface smoothness or mechanical properties are seen, and so there is little justification for the further increase in cost for extra materials.

The biaxially oriented sheets of the invention preferably have a water vapor permeability that is less than $0.85\times10^{-5}$ g/mm$^2$/day. This allows faster emulsion hardening, as the laminated support of this invention does not transmit water vapor from the emulsion layers during coating of the emulsions on the support. The transmission rate is measured by ASTM F1249.

"Void" is used herein to mean devoid of added solid and liquid matter, although it is likely the "voids" contain gas. The void-initiating particles which remain in the finished packaging sheet core should be from 0.1 to 10 $\mu$m in diameter, preferably round in shape, to produce voids of the desired shape and size. The size of the void is also dependent on the degree of orientation in the machine and transverse directions. Ideally, the void would assume a shape which is defined by two opposed and edge contacting concave disks. In other words, the voids tend to have a lens-like or biconvex shape. The voids are oriented so that the two major dimensions are aligned with the machine and transverse directions of the sheet. The Z-direction axis is a minor dimension and is roughly the size of the cross diameter of the voiding particle. The voids generally tend to be closed cells, and thus there is virtually no path open from one side of the voided core to the other side through which gas or liquid can traverse.

The void-initiating material may be selected from a variety of materials, and should be present in an amount of about 5–50% by weight based on the weight of the core matrix polymer. Preferably, the void-initiating material comprises a polymeric material. When a polymeric material is used, it may be a polymer that can be melt-mixed with the polymer from which the core matrix is made and be able to form dispersed spherical particles as the suspension is cooled down. Examples of this would include nylon dispersed in polypropylene, polybutylene terephthalate in polypropylene, or polypropylene dispersed in polyethylene terephthalate. If the polymer is preshaped and blended into the matrix polymer, the important characteristic is the size and shape of the particles. Spheres are preferred and they can be hollow or solid. These spheres may be made from cross-linked polymers which are members selected from the group consisting of an alkenyl aromatic compound having the general formula $Ar-C(R)=CH_2$, wherein Ar represents an aromatic hydrocarbon radical, or an aromatic halohydrocarbon radical of the benzene series and R is hydrogen or the methyl radical; acrylate-type monomers include monomers of the formula $CH_2=C(R')-C(O)(OR)$ wherein R is selected from the group consisting of hydrogen and an alkyl radical containing from about 1 to 12 carbon atoms and R' is selected from the group consisting of hydrogen and methyl; copolymers of vinyl chloride and vinylidene chloride, acrylonitrile and vinyl chloride, vinyl bromide, vinyl esters having formula $CH_2=CH(O)COR$, wherein R is an alkyl radical containing from 2 to 18 carbon atoms; acrylic acid, methacrylic acid, itaconic acid, citraconic acid, maleic acid, fumaric acid, oleic acid, vinylbenzoic acid; the synthetic polyester resins which are prepared by reacting terephthalic acid and dialkyl terephthalics or ester-forming derivatives thereof, with a glycol of the series $HO(CH_2)_nOH$ wherein n is a whole number within the range of 2–10 and having reactive olefinic linkages within the polymer molecule, the above-described polyesters which include copolymerized therein up to 20 percent by weight of a second acid or ester thereof having reactive olefinic unsaturation and mixtures thereof, and a cross-linking agent selected from the group consisting of divinylbenzene, diethylene glycol dimethacrylate, diallyl fumarate, diallyl phthalate and mixtures thereof.

Examples of typical monomers for making the cross-linked polymer include styrene, butyl acrylate, acrylamide, acrylonitrile, methyl methacrylate, ethylene glycol dimethacrylate, vinyl pyridine, vinyl acetate, methyl acrylate, vinylbenzyl chloride, vinylidene chloride, acrylic acid, divinylbenzene, acrylamidomethylpropane sulfonic acid, vinyl toluene, etc. Preferably, the cross-linked polymer is polystyrene or poly(methyl methacrylate). Most preferably, it is polystyrene and the cross-linking agent is divinylbenzene.

Processes well known in the art yield non-uniformly sized particles, characterized by broad particle size distributions. The resulting beads can be classified by screening the beads spanning the range of the original distribution of sizes. Other processes such as suspension polymerization, limited coalescence, directly yield very uniformly sized particles.

The void-initiating materials may be coated with agents to facilitate voiding. Suitable agents or lubricants include colloidal silica, colloidal alumina, and metal oxides such as tin oxide and aluminum oxide. The preferred agents are colloidal silica and alumina, most preferably, silica. The cross-linked polymer having a coating of an agent may be prepared by procedures well known in the art. For example, conventional suspension polymerization processes wherein the agent is added to the suspension are preferred. As the agent, colloidal silica is preferred.

The void-initiating particles can also be inorganic spheres, including solid or hollow glass spheres, metal or ceramic beads, or inorganic particles such as clay, talc, barium sulfate, and calcium carbonate. The important thing is that the material does not chemically react with the core matrix polymer to cause one or more of the following problems: (a) alteration of the crystallization kinetics of the matrix polymer, making it difficult to orient, (b) destruction of the core matrix polymer, (c) destruction of the void-initiating particles, (d) adhesion of the void-initiating particles to the matrix polymer, or (e) generation of undesirable reaction products, such as toxic or high color moieties. The void-initiating material should not be photographically active or degrade the performance of the photographic element in which the biaxially oriented polyolefin film is utilized.

For the biaxially oriented sheets on the top side toward the emulsion, suitable classes of thermoplastic polymers for the biaxially oriented sheet and the core matrix-polymer of the preferred composite sheet comprise polyolefins.

Suitable polyolefins include polypropylene, polyethylene, polymethylpentene, polystyrene, polybutylene, and mixtures thereof. Polyolefin copolymers, including copolymers of propylene and ethylene such as hexene, butene, and octene are also useful. Polypropylene is preferred, as it is low in cost and has desirable strength properties.

The nonvoided skin layers of the top composite sheet can be made of the same polymeric materials as listed above for the core matrix. The composite sheet can be made with skin(s) of the same polymeric material as the core matrix, or it can be made with skin(s) of different polymeric composition than the core matrix. In the case of a multiple layer system, when different polymeric materials are used, an additional layer may be required to promote adhesion between non-compatible polymeric materials so that the biaxially oriented sheets do not have layer fracture during manufacturing or in the final imaging element format.

The total thickness of the topmost skin layer or exposed surface layer should be between 0.20 μm and 1.5 μm, preferably between 0.5 and 1.0 μm. Below 0.5 μm any inherent non-planarity in the coextruded skin layer may result in unacceptable color variation. At skin thickness greater than 1.0 μm, there is a reduction in the photographic optical properties such as image resolution. At thickness greater that 1.0 μm, there is also a greater material volume to filter for contamination such as clumps, poor color pigment dispersion, or contamination.

Addenda may be added to the topmost skin layer to change the color of the imaging element. For photographic use, a white base with a slight bluish tinge is preferred. The addition of the slight bluish tinge may be accomplished by any process which is known in the art including the machine blending of color concentrate prior to extrusion and the melt extrusion of blue colorants that have been preblended at the desired blend ratio. Colored pigments that can resist extrusion temperatures greater than 320° C. are preferred, as temperatures greater than 320° C. are necessary for coextrusion of the skin layer. Blue colorants used in this invention may be any colorant that does not have an adverse impact on the imaging element. Preferred blue colorants include Phthalocyanine blue pigments, Cromophtal blue pigments, Irgazin blue pigments, Irgalite organic blue pigments, and pigment Blue 60.

One preferred embodiment of this invention is a very thin coating (0.2 to 1.5 μm) on the surface immediately below the emulsion layer can be made by coextrusion with the polyolefin layers and subsequent stretching in the width and length direction to form the biaxially oriented film. It has been found that this layer is, by nature, extremely accurate in thickness and can be used to provide all the color corrections which are usually distributed throughout the thickness of the sheet between the emulsion and the paper base. This topmost layer is so efficient that the total colorants needed to provide a correction are less than one-half the amount needed if the colorants are dispersed throughout thickness. Colorants are often the cause of spot defects due to clumps and poor dispersions. Spot defects, which decrease the commercial value of images, are improved with this invention because less colorant is used, and high quality filtration to clean up the colored layer is much more feasible since the total volume of polymer with colorant is only typically 2 to 10 percent of the total polymer between the base paper and the photosensitive layer.

While the addition of $TiO_2$ in the thin skin layer of this invention does not significantly contribute to the optical performance of the sheet, it can cause numerous manufacturing problems such as extrusion die lines and spots. The skin layer substantially free of $TiO_2$ is preferred. $TiO_2$ added to a layer between 0.20 and 1.5 μm does not substantially improve the optical properties of the support, will add cost to the design, and will cause objectionable pigments lines in the extrusion process.

Addenda may be added to the biaxially oriented sheet of this invention so that when the biaxially oriented sheet is viewed from a surface, the imaging element emits light in the visible spectrum when exposed to ultraviolet radiation. Emission of light in the visible spectrum allows for the support to have a desired background color in the presence of ultraviolet energy. This is particularly useful when images are viewed outside as sunlight contains ultraviolet energy and may be used to optimize image quality for consumer and commercial applications.

Addenda known in the art to emit visible light in the blue spectrum are preferred. Consumers generally prefer a slight blue tint to white defined as a negative b* compared to a white white defined as a b* within one b* unit of zero. b* is the measure of yellow/blue in CIE space. A positive b* indicates yellow, while a negative b* indicates blue. The addition of addenda that emits in the blue spectrum allows for tinting the support without the addition of colorants which would decrease the whiteness of the image. The preferred emission is between 1 and 5 delta b* units. Delta b* is defined as the b* difference measured when a sample is illuminated ultraviolet light source and a light source without any significant ultraviolet energy. Delta b* is the preferred measure to determine the net effect of adding an optical brightener to the top biaxially oriented sheet of this invention. Emissions less than 1 b* unit cannot be noticed by most customers; therefore, is it not cost effective to add only a small amount of optical brightener to the biaxially oriented sheet. An emission greater that 5 b* units would interfere with the color balance of the prints, making the whites appear too blue for most consumers.

The preferred addenda of this invention is an optical brightener. An optical brightener is colorless, fluorescent, organic compound that absorbs ultraviolet light and emits it as visible blue light. Examples include, but are not limited to, derivatives of 4,4'-diaminostilbene-2,2'-disulfonic acid, coumarin derivatives such as 4-methyl-7-diethylaminocoumarin, 1-4-Bis (O-Cyanostyryl) Benzol, and 2-Amino-4-Methyl Phenol.

Layers below the exposed surface layer in biaxially oriented sheet of the invention may also contain pigments which are known to improve the photographic optical responses such as whiteness or sharpness. Titanium dioxide is used in this invention to improve image sharpness, whiteness, and provide the required level of opacity to the biaxially oriented sheets. The $TiO_2$ used may be either anatase or rutile type. For this invention, rutile is the preferred because the unique particle size and geometry optimize image quality for most consumer applications. Examples of rutile $TiO_2$ that are acceptable for a photographic system are DuPont Chemical Co. R101 rutile $TiO_2$ and DuPont Chemical Co. R104 rutile $TiO_2$. Other pigments to improve image quality may also be used in this invention.

Traditional photographic supports that contain optical brightener generally use anatase $TiO_2$ in combination optical brightener. The use of rutile $TiO_2$, while preferred for image quality, tends to reduce the efficiency of the optical brightener when optical brightener and rutile $TiO_2$ are used in combination. Prior art photographic supports containing optical brightener generally use anatase $TiO_2$ in combination with optical brightener. By concentrating the optical brightener and rutile $TiO_2$ in one functional thin layer, rutile $TiO_2$ does not significantly reduce the efficiency of the optical brightener, allowing for rutile $TiO_2$ and optical brightener to be used together which improves image quality. The preferred location for the $TiO_2$ is adjacent to the exposed layer. This location allows for efficient manufacture of the biaxially oriented coextruded structure, as the $TiO_2$ does not come in contact with exposed extrusion die surfaces.

The optical brightener may be added to any layer in the multilayer coextruded biaxially oriented polyolefin sheet. The preferred location is adjacent to or in the exposed surface layer of said sheet. This allows for the efficient concentration of optical brightener which results in less optical brightener being used when compared to traditional photographic supports. Typically 20% to 40% less optical brightener is required when the optical brightener is concentrated in a functional layer close to the imaging layers.

If the desired weight percent loading of the optical brightener begins to approach a concentration at which the optical brightener migrates to the surface of the support forming crystals in the imaging layer, then the addition of optical brightener into the layer adjacent to the exposed layer is preferred. In prior art imaging supports that use optical brightener, an expensive grade of optical brightener is used to prevent migration into the imaging layer. When optical brightener migration is a concern, as with light sensitive silver halide imaging systems, the preferred top layer comprises polyethylene that is substantially free of optical brightener. In this case, the migration from the layer adjacent to the top layer is significantly reduced because the exposed surface layer acts as a barrier for optical brightener migration, allowing for much higher optical brightener levels to be used to optimize image quality. Further, locating the optical brightener in the layer adjacent to the top layer allows for a less expensive optical brightener to be used. The top layer, which is substantially free of optical brightener, prevents significant migration of the optical brightener.

A biaxially oriented sheet of this invention which has a microvoided core is preferred. The microvoided core adds opacity and whiteness to the imaging support, further improving imaging quality. Combining the image quality advantages of a microvoided core with a material which absorbs ultraviolet energy and emits light in the visible spectrum allows for the unique optimization of image quality, as the image support can have a tint when exposed to ultraviolet energy, yet retain excellent whiteness when the image is viewed using lighting that does not contain significant amounts of ultraviolet energy such as indoor lighting.

Addenda may be also added to the core matrix to further improve the whiteness of these sheets. This would include any process which is known in the art, including adding a white pigment, such as titanium dioxide, barium sulfate, clay, or calcium carbonate. This would also include adding fluorescing agents which absorb energy in the ultraviolet region and emit light largely in the blue region, or other additives which would improve the physical properties of the sheet or the manufacturability of the sheet.

The coextrusion, quenching, orienting, and heat setting of these composite sheets may be effected by any process which is known in the art for producing oriented sheet, such as by a flat sheet process or a bubble or tubular process. The flat sheet process involves extruding the blend through a slit die and rapidly quenching the extruded web upon a chilled casting drum so that the core matrix polymer component of the sheet and the skin components(s) are quenched below their glass solidification temperature. The quenched sheet is then biaxially oriented by stretching in mutually perpendicular directions at a temperature above the glass transition temperature and below the melting temperature of the matrix polymers. The sheet may be stretched in one direction and then in a second direction or may be simultaneously stretched in both directions. A stretching ratio, defined as the final length divided by the original length for sum of the machine and cross directions, of at least 10 to 1 is preferred. After the sheet has been stretched, it is heat set by heating to a temperature sufficient to crystallize or anneal the polymers, while restraining to some degree the sheet against retraction in both directions of stretching.

The composite sheet, while described as having preferably at least three layers of a core and a skin layer on each side, may also be provided with additional layers that may serve to change the properties of the biaxially oriented sheet. Biaxially oriented sheets could be formed with surface layers that would provide an improved adhesion or look to the support and photographic element. The biaxially oriented extrusion could be carried out with as many as 10 layers if desired to achieve some particular desired property.

These composite sheets may be coated or treated after the coextrusion and orienting process or between casting and full orientation with any number of coatings which may be used to improve the properties of the sheets. The treatment may increase printability, provide a vapor barrier, make them heat sealable, or improve the adhesion to the support or to the photosensitive layers. Examples of this would be acrylic coatings for printability and coating polyvinylidene chloride for heat seal properties. Further examples include flame, plasma or corona discharge treatment to improve printability or adhesion.

By having at least one nonvoided skin on the microvoided core, the tensile strength of the sheet is increased and makes it more manufacturable. It allows the sheets to be made at wider widths and higher draw ratios than when sheets are made with all layers voided. Coextruding the layers further simplifies the manufacturing process.

The structure of a preferred biaxially oriented top polymer sheet of the invention where the top polyethylene surface is coated with the imaging layers is as follows:

Polyethylene surface layer containing blue pigments

Polypropylene with optical brightener and rutile $TiO_2$

Microvoided polypropylene with density=0.60 $g/cm^3$

Polypropylene with optical brightener

The sheet on the side of the base paper opposite the emulsion layers may be any suitable sheet. The bottom sheet may or may not be microvoided. It may have the same composition as the sheet on the top side of the paper backing material. Biaxially oriented sheets are conveniently manufactured by coextrusion of the sheet, which may contain several layers, followed by biaxial orientation. Such biaxially oriented sheets are disclosed in, for example, U.S. Pat. No. 4,764,425.

The preferred bottom biaxially oriented sheet is a biaxially oriented polyolefin sheet, most preferably a sheet of polyethylene or polypropylene. The thickness of the biaxially oriented sheet should be from 10 to 150 $\mu$m. Below 15 $\mu$m, the sheets may not be thick enough to minimize any inherent non-planarity in the support and would be more difficult to manufacture. At thickness higher than 70 $\mu$m, little improvement in either surface smoothness or mechanical properties is seen, and so there is little justification for the further increase in cost for extra materials.

Suitable classes of thermoplastic polymers for the bottom biaxially oriented sheet include polyolefins, polyesters, polyamides, polycarbonates, cellulosic esters, polystyrene, polyvinyl resins, polysulfonamides, polyethers, polyimides, polyvinylidene fluoride, polyurethanes, polyphenylenesulfides, polytetrafluoroethylene, polyacetals, polysulfonates, polyester ionomers, and polyolefin ionomers. Copolymers and/or mixtures of these polymers can be used.

Suitable polyolefins for the bottom sheet include polypropylene, polyethylene, polymethylpentene, and mixtures thereof. Polyolefin copolymers, including copolymers of propylene and ethylene such as hexene, butene and octene, are also useful. Polypropylenes are preferred because they are low in cost and have good strength and surface properties.

Suitable polyesters include those produced from aromatic, aliphatic or cycloaliphatic dicarboxylic acids of 4–20 carbon atoms and aliphatic or alicyclic glycols having from 2–24 carbon atoms. Examples of suitable dicarboxylic acids include terephthalic, isophthalic, phthalic, naphthalene dicarboxylic acid, succinic, glutaric, adipic, azelaic, sebacic, fumaric, maleic, itaconic, 1,4-cyclohexanedicarboxylic, sodiosulfoisophthalic, and mixtures thereof. Examples of suitable glycols include ethylene glycol, propylene glycol, butanediol, pentanediol, hexanediol, 1,4-cyclohexanedimethanol, diethylene glycol, other polyethylene glycols, and mixtures thereof. Such polyesters are well known in the art and may be produced by well-known techniques, e.g., those described in U.S. Pat. Nos. 2,465,319 and 2,901,466. Preferred continuous matrix polyesters are those having repeat units from terephthalic acid or naphthalene dicarboxylic acid and at least one glycol selected from ethylene glycol, 1,4-butanediol, and 1,4-cyclohexanedimethanol. Poly(ethylene terephthalate), which may be modified by small amounts of other monomers, is especially preferred. Other suitable polyesters include liquid crystal copolyesters formed by the inclusion of suitable amount of a co-acid component such as stilbene dicarboxylic acid. Examples of such liquid crystal copolyesters are those disclosed in U.S. Pat. Nos. 4,420,607; 4,459,402; and 4,468,510.

Useful bottom sheet polyamides include nylon 6, nylon 66, and mixtures thereof. Copolymers of polyamides are also suitable continuous phase polymers. An example of a useful polycarbonate is bisphenol-A polycarbonate. Cellulosic esters suitable for use as the continuous phase polymer of the composite sheets include cellulose nitrate, cellulose triacetate, cellulose diacetate, cellulose acetate propionate, cellulose acetate butyrate, and mixtures or copolymers thereof. Useful polyvinyl resins include polyvinyl chloride, poly(vinyl acetal), and mixtures thereof. Copolymers of vinyl resins can also be utilized.

The bottom biaxially oriented sheet on the backside of the laminated base can be made with layers of the same polymeric material, or it can be made with layers of different polymeric composition. For compatibility, an auxiliary layer can be used to promote adhesion of multiple layers.

Addenda may be added to the biaxially oriented backside sheet to improve the whiteness of these sheets. This would include any process which is known in the art including adding a white pigment, such as titanium dioxide, barium sulfate, clay, or calcium carbonate. The addition of fluorescing agents, which absorb energy in the ultraviolet region and emit light largely in the blue region, is preferred. The addition of materials, which absorb energy in the ultraviolet region and emit light in the blue region to the backside sheet, masks the yellowing of the paper as the paper ages with time and temperature. The preferred location for the optical brightener for bottom sheet of this invention is adjacent to the exposed skin layer. This allows for the skin layer to act as a barrier for optical brightener migration.

The coextrusion, quenching, orienting, and heat setting of these biaxially oriented sheets may be effected by any process which is known in the art for producing oriented sheet, such as by a flat sheet process or a bubble or tubular process. The flat sheet process involves extruding or coextruding the blend through a slit die and rapidly quenching the extruded or coextruded web upon a chilled casting drum so that the polymer component(s) of the sheet are quenched below their solidification temperature. The quenched sheet is then biaxially oriented by stretching in mutually perpendicular directions at a temperature above the glass transition temperature of the polymer(s). The sheet may be stretched in one direction and then in a second direction or may be simultaneously stretched in both directions. After the sheet has been stretched, it is heat set by heating to a temperature sufficient to crystallize the polymers, while restraining to some degree the sheet against retraction in both directions of stretching.

The biaxially oriented sheet on the backside of the laminated base, while described as having preferably at least one layer, may also be provided with additional layers that may serve to change the properties of the biaxially oriented sheet. A different effect may be achieved by additional layers. Such layers might contain tints, antistatic materials, or slip agents to produce sheets of unique properties. Biaxially oriented sheets could be formed with surface layers that would provide an improved adhesion or look to the support and photographic element. The biaxially oriented extrusion could be carried out with as many as 10 layers if desired to achieve some particular desired property.

These biaxially oriented sheets may be coated or treated after the coextrusion and orienting process or between casting and full orientation with any number of coatings which may be used to improve the properties of the sheets including printability, to provide a vapor barrier, to make them heat sealable, or to improve the adhesion to the support or to the photosensitive layers. Examples of this would be acrylic coatings for printability and a coating of polyvinylidene chloride for heat seal properties. Further examples include flame, plasma, or corona discharge treatment to improve printability or adhesion.

The structure of a preferred biaxially oriented bottom sheet of the invention where the solid core layer is bonded to the support base is as follows:

Polyethylene and a terpolymer of ethylene propylene and butylene (skin layer)

Polypropylene with rutile $TiO_2$ (core layer)

The support to which the microvoided composite sheets and biaxially oriented sheets are laminated for the laminated support of the photosensitive silver halide layer may be a polymeric, a synthetic paper, cloth, woven polymer fibers, or a cellulose fiber paper support, or laminates thereof. The base also may be a microvoided polyethylene terephthalate such as disclosed in U.S. Pat. Nos. 4,912,333; 4,994,312; and 5,055,371.

The preferred support is a photographic grade cellulose fiber paper. Traditional photographic grade paper contain optical brightener to provide a slight blue tint to the paper when viewed from the backside. This slight blue tint masks the undesirable yellowing of the paper over time. When optical brightener is added to the top and bottom sheets, a cellulose base paper substantially free of optical brightener is preferred, as the optical brightener can be concentrated and, thus, more effective in the biaxially oriented sheet laminated to the base paper.

When using a cellulose fiber paper support, it is preferable to extrusion laminate the microvoided composite sheets to the base paper using a polyolefin resin. Extrusion laminating is carried out by bringing together the biaxially oriented sheets of the invention and the base paper with application of an adhesive between them, followed by their being pressed in a nip such as between two rollers. The adhesive may be applied to either the biaxially oriented sheets or the base paper prior to their being brought into the nip. In a preferred form the adhesive is applied into the nip simultaneously with the biaxially oriented sheets and the base paper. The adhesive may be any suitable material that does not have a harmful effect upon the photographic element. A preferred material is polyethylene that is melted at the time it is placed into the nip between the paper and the biaxially oriented sheets.

As used herein, the phrase "imaging element" is a material that utilizes either photosensitive silver halide in the formation of images or non-photographic technology in the formation of images. The imaging elements can be black-and-white, single color elements, or multicolor elements. Non-photographic imaging methods include thermal dye transfer, ink jet, electrophotographic, electrographic, flexographic printing, or rotogravure printing in an image receiving layer.

The thermal dye image-receiving layer of the receiving elements of the invention may comprise, for example, a polycarbonate, a polyurethane, a polyester, polyvinyl chloride, poly(styrene-co-acrylonitrile), poly(caprolactone), or mixtures thereof. The dye image-receiving layer may be present in any amount which is effective for the intended purpose. In general, good results have been obtained at a concentration of from about 1 to about 10 $g/m^2$. An overcoat layer may be further coated over the dye-receiving layer, such as described in U.S. Pat. No. 4,775,657 of Harrison et al.

Dye-donor elements that are used with the dye-receiving element of the invention conventionally comprise a support having thereon a dye containing layer. Any dye can be used in the dye-donor employed in the invention, provided it is transferable to the dye-receiving layer by the action of heat. Especially good results have been obtained with sublimable dyes. Dye donors applicable for use in the present invention are described, e.g., in U.S. Pat. Nos. 4,916,112; 4,927,803; and 5,023,228.

As noted above, dye-donor elements are used to form a dye transfer image. Such a process comprises image-wise-heating, a dye-donor element, and transferring a dye image to a dye-receiving element as described above to form the dye transfer image.

In a preferred embodiment of the thermal dye transfer method of printing, a dye donor element is employed which comprises a poly-(ethylene terephthalate) support coated with sequential repeating areas of cyan, magenta, and yellow dye, and the dye transfer steps are sequentially performed for each color to obtain a three-color dye transfer image. Of course, when the process is only performed for a single color, then a monochrome dye transfer image is obtained.

Thermal printing heads which can be used to transfer dye from dye-donor elements to receiving elements of the invention are available commercially. There can be employed, for example, a Fujitsu Thermal Head (FTP-040 MCS001), a TDK Thermal Head F415 HH7-1089, or a Rohm Thermal Head KE 2008-F3. Alternatively, other known sources of energy for thermal dye transfer may be used, such as lasers as described in, for example, GB No. 2,083,726A.

A thermal dye transfer assemblage of the invention comprises (a) a dye-donor element and (b) a dye-receiving element as described above, the dye-receiving element being in a superposed relationship with the dye-donor element so that the dye layer of the donor element is in contact with the dye image-receiving layer of the receiving element.

When a three-color image is to be obtained, the above assemblage is formed on three occasions during the time when heat is applied by the thermal printing head. After the first dye is transferred, the elements are peeled apart. A second dye-donor element (or another area of the donor element with a different dye area) is then brought in register with the dye-receiving element and the process repeated. The third color is obtained in the same manner.

The electrographic and electrophotographic processes and their individual steps have been well described in detail in many books and patents. The processes incorporate the basic steps of creating an electrostatic image, developing that image with charged, colored particles (toner), optionally transferring the resulting developed image to a secondary substrate, and fixing the image to the substrate. There are numerous variations in these processes and basic steps; the use of liquid toners in place of dry toners is simply one of those variations.

The first basic step, creation of an electrostatic image, can be accomplished by a variety of methods. The electrophotographic process of copiers uses imagewise photodischarge, through analog or digital exposure, of a uniformly charged photoconductor. The photoconductor may be a single-use system, or it may be rechargeable and reimageable, like those based on selenium or organic photoreceptors.

In one form of the electrophotographic process, copiers use imagewise photodischarge, through analog or digital exposure, of a uniformly charged photoconductor. The photoconductor may be a single-use system, or it may be rechargeable and reimageable, like those based on selenium or organic photoreceptors.

In one form of the electrophotographic process, a photosensitive element is permanently imaged to form areas of differential conductivity. Uniform electrostatic charging, followed by differential discharge of the imaged element, creates an electrostatic image. These elements are called electrographic or xeroprinting masters because they can be repeatedly charged and developed after a single imaging exposure.

In an alternate electrographic process, electrostatic images are created ionographically. The latent image is created on dielectric (charge-holding) medium, either paper or film. Voltage is applied to selected metal styli or writing nibs from an array of styli spaced across the width of the medium, causing a dielectric breakdown of the air between the selected styli and the medium. Ions are created, which form the latent image on the medium.

Electrostatic images, however generated, are developed with oppositely charged toner particles. For development with liquid toners, the liquid developer is brought into direct contact with the electrostatic image. Usually a flowing liquid is employed, to ensure that sufficient toner particles are available for development. The field created by the electrostatic image causes the charged particles, suspended in a nonconductive liquid, to move by electrophoresis. The charge of the latent electrostatic image is thus neutralized by the oppositely charged particles.

If a reimageable photoreceptor or an electrographic master is used, the toned image is transferred to paper (or other substrate). The paper is charged electrostatically, with the polarity chosen to cause the toner particles to transfer to the paper. Finally, the toned image is fixed to the paper. For self-fixing toners, residual liquid is removed from the paper by air-drying or heating. Upon evaporation of the solvent, these toners form a film bonded to the paper. For heat-fusible toners, thermoplastic polymers are used as part of the particle. Heating both removes residual liquid and fixes the toner to paper.

The dye receiving layer (DRL) for ink jet imaging may be applied by any known methods, such as solvent coating or melt extrusion coating techniques. The DRL is coated over the tie layer (TL) at a thickness ranging from 0.1 to 10 μm, preferably 0.5 to 5 μm. There are many known formulations which may be useful as dye receiving layers. The primary requirement is that the DRL is compatible with the inks which it will be imaged so as to yield the desirable color gamut and density. As the ink drops pass through the DRL, the dyes are retained or mordanted in the DRL, while the ink solvents pass freely through the DRL and are rapidly absorbed by the TL. Additionally, the DRL formulation is preferably coated from water, exhibits adequate adhesion to the TL, and allows for easy control of the surface gloss.

For example, Misuda et al. in U.S. Pat. Nos. 4,879,166; 5,264,275; 5,104,730; 4,879,166; and Japanese Patents 1,095,091; 2,276,671; 2,276,670; 4,267,180; 5,024,335; and 5,016,517 disclose aqueous based DRL formulations comprising mixtures of pseudo-bohemite and certain water soluble resins. Light, in U.S. Pat. Nos. 4,903,040; 4,930,041; 5,084,338; 5,126,194; 5,126,195; 5,139,8667; and 5,147, 717 disclose aqueous-based DRL formulations comprising mixtures of vinyl pyrrolidone polymers and certain water-dispersible and/or water-soluble polyesters, along with other polymers and addenda. Butters et al in U.S. Pat. Nos. 4,857,386 and 5,102,717 disclose ink-absorbent resin layers comprising mixtures of vinyl pyrrolidone polymers and acrylic or methacrylic polymers. Sato et al in U.S. Pat. No. 5,194,317, and Higuma et al, in U.S. Pat. No. 5,059,983, disclose aqueous-coatable DRL formulations based on poly (vinyl alcohol). Iqbal in U.S. Pat. No. 5,208,092 discloses water-based ink receiving layer (IRL) formulations comprising vinyl copolymers which are subsequently cross-linked. In addition to these examples, there may be other known or contemplated DRL formulations which are consistent with the aforementioned primary and secondary requirements of the DRL, all of which fall under the spirit and scope of the current invention.

The preferred DRL is a 0.1 to 10 μm DRL which is coated as an aqueous dispersion of 5 parts alumoxane and 5 parts poly (vinyl pyrrolidone). The DRL may also contain varying levels and sizes of matting agents for the purpose of controlling gloss, friction, and/or fingerprint resistance, surfactants to enhance surface uniformity and to adjust the surface tension of the dried coating, mordanting agents, antioxidants, UV absorbing compounds, light stabilizers, and the like.

Although the ink-receiving elements as described above can be successfully used to achieve the objectives of the present invention, it may be desirable to overcoat the DRL for the purpose of enhancing the durability of the imaged element. Such overcoats may be applied to the DRL either before or after the element is imaged. For example, the DRL can be overcoated with an ink-permeable layer through which inks freely pass. Layers of this type are described in U.S. Pat. Nos. 4,686,118; 5,027,131; and 5,102,717; and in European Patent Specification 0 524 626. Alternatively, an overcoat may be added after the element is imaged. Any of the known laminating films and equipment may be used for this purpose. The inks used in the aforementioned imaging process are well known, and the ink formulations are often closely tied to the specific processes, i.e., continuous, piezoelectric, or thermal. Therefore, depending on the specific ink process, the inks may contain widely differing amounts and combinations of solvents, colorants, preservatives, surfactants, humectants, and the like. Inks preferred for use in combination with the image recording elements of the present invention are water-based, such as those currently sold for use in the Hewlett-Packard Desk Writer 560C printer. However, it is intended that alternative embodiments of the image-recording elements as described above, which may be formulated for use with inks which are specific to a given ink-recording process or to a given commercial vendor, fall within the scope of the present invention.

Printing is generally accomplished by Flexographic or Rotogravure. Flexography is an offset letterpress technique where the printing plates are made from rubber or photopolymers. The printing is accomplished by the transfer of the ink from the raised surface of the printing plate to the support of this invention. The Rotogravure method of printing uses a print cylinder with thousands of tiny cells which are below the surface of the printing cylinder. The ink is transferred from the cells when the print cylinder is brought into contact with the web at the impression roll.

Suitable inks for this invention include solvent based inks, water based inks, and radiation cured inks. Examples of solvent based inks include nitrocellulose maleic, nitrocellulose polyamide, nitrocellulose acrylic, nitrocellulose urethane, chlorinated rubber, vinyl, acrylic, alcohol soluble acrylic, cellulose acetate acrylic styrene, and other synthetic polymers. Examples of water based inks include acrylic emulsion, maleic resin dispersion, styrene maleic anhydride resins, and other synthetic polymers. Examples of radiation cured inks include ultraviolet and electron beam cure inks.

When the support of this invention is printed with Flexographic or Rotogravure inks, an ink adhesion coating may be required to allow for efficient printing of the support. The top layer of the biaxially oriented sheet may be coated with any materials known in the art to improve ink adhesion to biaxially oriented polyolefin sheets of this invention. Examples include acrylic coatings and polyvinyl alcohol coatings. Surface treatments to the biaxially oriented sheets of this invention may also be used to improve ink adhesion. Examples include corona and flame treatment.

The imaging elements may also contain a transparent magnetic recording layer such as a layer containing magnetic particles on the underside of a transparent support, as in U.S. Pat. Nos. 4,279,945 and 4,302,523. Typically, the element will have a total thickness (excluding the support) of from about 5 to about 30 μm.

The photographic elements can be black-and-white, single color elements, or multicolor elements. Multicolor elements contain image dye-forming units sensitive to each of the three primary regions of the spectrum. Each unit can comprise a single emulsion layer or multiple emulsion layers sensitive to a given region of the spectrum. The layers of the element, including the layers of the image-forming units, can be arranged in various orders as known in the art. In an alternative format, the emulsions sensitive to each of the three primary regions of the spectrum can be disposed as a single segmented layer.

The photographic emulsions useful for this invention are generally prepared by precipitating silver halide crystals in a colloidal matrix by methods conventional in the art. The colloid is typically a hydrophilic film forming agent such as gelatin, alginic acid, or derivatives thereof.

The crystals formed in the precipitation step are washed and then chemically and spectrally sensitized by adding spectral sensitizing dyes and chemical sensitizers, and by providing a heating step during which the emulsion temperature is raised, typically from 40° C. to 70° C., and maintained for a period of lime. The precipitation and spectral and chemical sensitization methods utilized in preparing the emulsions employed in the invention can be those methods known in the art.

Chemical sensitization of the emulsion typically employs sensitizers such as sulfur-containing compounds, e.g., allyl isothiocyanate, sodium thiosulfate and allyl thiourea; reducing agents, e.g., polyamines and stannous salts; noble metal compounds, e.g., gold, platinum; and polymeric agents, e.g., polyalkylene oxides. As described, heat treatment is employed to complete chemical sensitization. Spectral sensitization is effected with a combination of dyes, which are designed for the wavelength range of interest within the visible or infrared spectrum. It is known to add such dyes both before and after heat treatment.

After spectral sensitization, the emulsion is coated on a support. Various coating techniques include dip coating, air knife coating, curtain coating, and extrusion coating.

The silver halide emulsions utilized in this invention may be comprised of any halide distribution. Thus, they may be comprised of silver chloride, silver bromide, silver bromochloride, silver chlorobromide, silver iodochloride, silver iodobromide, silver bromoiodochloride, silver chloroiodobromide, silver iodobromochloride, and silver iodochlorobromide emulsions. It is preferred, however, that the emulsions be predominantly silver chloride emulsions. By predominantly silver chloride, it is meant that the grains of the emulsion are greater than about 50 mole percent silver chloride. Preferably, they are greater than about 90 mole percent silver chloride; and optimally greater than about 95 mole percent silver chloride.

The silver halide emulsions can contain grains of any size and morphology. Thus, the grains may take the form of cubes, octahedrons, cubo-octahedrons, or any of the other naturally occurring morphologies of cubic lattice type silver halide grains. Further, the grains may be irregular such as spherical grains or tabular grains. Grains having a tabular or cubic morphology are preferred.

The photographic elements of the invention may utilize emulsions as described in The Theory of the Photographic Process, Fourth Edition, T. H. James, Macmillan Publishing Company, Inc., 1977, pages 151–152. Reduction sensitization has been known to improve the photographic sensitivity of silver halide emulsions. While reduction sensitized silver halide emulsions generally exhibit good photographic speed, they often suffer from undesirable fog and poor storage stability.

Reduction sensitization can be performed intentionally by adding reduction sensitizers, chemicals which reduce silver ions to form metallic silver atoms, or by providing a reducing environment such as high pH (excess hydroxide ion) and/or low pAg (excess silver ion). During precipitation of a silver halide emulsion, unintentional reduction sensitization can occur when, for example, silver nitrate or alkali solutions are added rapidly or with poor mixing to form emulsion grains. Also, precipitation of silver halide emulsions in the presence of ripeners (grain growth modifiers) such as thioethers, selenoethers, thioureas, or ammonia tends to facilitate reduction sensitization.

Examples of reduction sensitizers and environments which may be used during precipitation or spectral/chemical sensitization to reduction sensitize an emulsion include ascorbic acid derivatives; tin compounds; polyamine compounds; and thiourea dioxide-based compounds described in U.S. Pat. Nos. 2,487,850; 2,512,925; and British Patent 789,823. Specific examples of reduction sensitizers or conditions, such as dimethylamineborane, stannous chloride, hydrazine, high pH (pH 8–11) and low pAg (pAg 1–7) ripening are discussed by S. Collier in Photographic Science and Engineering, 23, 113 (1979). Examples of processes for preparing intentionally reduction sensitized silver halide emulsions are described in EP 0 348 934 A1 (Yamashita), EP 0 369 491 (Yamashita), EP 0 371 388 (Ohashi), EP 0 396 424 A1 (Takada), EP 0 404 142 A1 (Yamada), and EP 0 435 355 A1 (Makino).

The photographic elements of this invention may use emulsions doped with Group VIII metals such as iridium, rhodium, osmium, and iron as described in *Research Disclosure*, September 1994, Item 36544, Section I, published by Kenneth Mason Publications, Ltd., Dudley Annex, 12a North Street, Emsworth, Hampshire PO10 7DQ, ENGLAND. Additionally, a general summary of the use of iridium in the sensitization of silver halide emulsions is contained in Carroll, "Iridium Sensitization: A Literature Review," Photographic Science and Engineering, Vol. 24, No. 6, 1980. A method of manufacturing a silver halide emulsion by chemically sensitizing the emulsion in the presence of an iridium salt and a photographic spectral sensitizing dye is described in U.S. Pat. No. 4,693,965. In some cases, when such dopants are incorporated, emulsions show an increased fresh fog and a lower contrast sensitometric curve when processed in the color reversal E-6 process as described in The British Journal of Photography Annual, 1982, pages 201–203.

A typical multicolor photographic element of the invention comprises the invention laminated support bearing a cyan dye image-forming unit comprising at least one red-sensitive silver halide emulsion layer having associated therewith at least one cyan dye-forming coupler; a magenta image-forming unit comprising at least one green-sensitive silver halide emulsion layer having associated therewith at least one magenta dye-forming coupler; and a yellow dye image-forming unit comprising at least one blue-sensitive silver halide emulsion layer having associated therewith at least one yellow dye-forming coupler. The element may contain additional layers, such as filter layers, interlayers, overcoat layers, subbing layers, and the like. The support of the invention may also be utilized for black and white photographic print elements.

The photographic elements may also contain a transparent magnetic recording layer such as a layer containing magnetic particles on the underside of a transparent support, as in U.S. Pat. Nos. 4,279,945 and 4,302,523. Typically, the element will have a total thickness (excluding the support) of from about 5 to about 30 $\mu$m.

The invention may be utilized with the materials disclosed in *Research Disclosure,* 40145 of September 1997. The invention is particularly suitable for use with the materials of the color paper examples of sections XVI and XVII. The couplers of section II are also particularly suitable. The Magenta I couplers of section II, particularly M-7, M-10, M-11, and M-18 set forth below are particularly desirable.

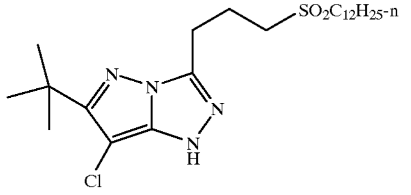

M-7

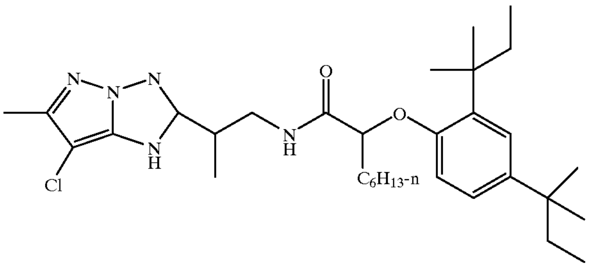

M-10

M-11

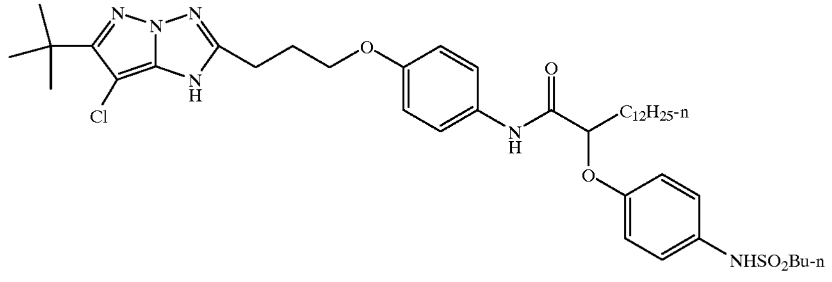

M-18

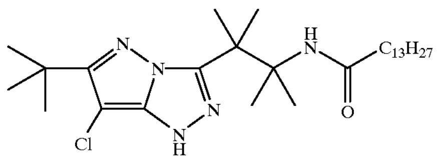

In order to successfully transport display materials of the invention, the reduction of static caused by web transport through manufacturing and image processing is desirable. Since the light sensitive imaging layers of this invention can be fogged by light from a static discharge accumulated by the web as it moves over conveyance equipment such as rollers and drive nips, the reduction of static is necessary to avoid undesirable static fog. The polymer materials of this invention have a marked tendency to accumulate static charge as they contact machine components during transport. The use of an antistatic material to reduce the accumulated charge on the web materials of this invention is desirable. Antistatic materials may be coated on the web materials of this invention and may contain any known materials in the art which can be coated on photographic web materials to reduce static during the transport of photographic paper. Examples of antistatic coatings include conductive salts and colloidal silica. Desirable antistatic properties of the support materials of this invention may also be accomplished by antistatic additives which are an integral part of the polymer layer. Incorporation of additives that migrate to the surface of the polymer to improve electrical conductivity include fatty quaternary ammonium compounds, fatty amines, and phosphate esters. Other types of antistatic additives are hygroscopic compounds such as polyethylene glycols and hydrophobic slip additives that reduce the coefficient of friction of the web materials. An antistatic coating applied to the opposite side of the image layer or incorporated into the backside polymer layer is preferred. The backside is preferred because the majority of the web contact during conveyance in manufacturing and photoprocessing is on the backside. The preferred surface resistivity of the antistat coat at 50% RH is less than $10^{13}$ ohm/square. A surface resistivity of the antistat coat at 50% RH is less than $10^{13}$ ohm/square has been shown to sufficiently reduce static fog in manufacturing and during photoprocessing of the image layers.

In the following Table, reference will be made to (1) *Research Disclosure,* December 1978, Item 17643, (2) *Research Disclosure*, December 1989, Item 308119, and (3) *Research Disclosure*, September 1996, Item 38957, all published by Kenneth Mason Publications, Ltd., Dudley Annex, 12a North Street, Emsworth, Hampshire PO10 7DQ, ENGLAND. The Table and the references cited in the Table are to be read as describing particular components suitable for use in the elements of the invention. The Table and its cited references also describe suitable ways of preparing, exposing, processing and manipulating the elements, and the images contained therein.

| Reference | Section | Subject Matter |
|---|---|---|
| 1 | I, II | Grain composition, |
| 2 | I, II, IX, X | morphology and preparation. |
| | XI, XII, | Emulsion preparation |
| | XIV, XV | including hardeners, coating |
| | I, II, III, IX | aids, addenda, etc. |
| 3 | A & B | |
| 1 | III, IV | Chemical sensitization and |
| 2 | III, IV | spectral sensitization/ |
| 3 | IV, V | desensitization |
| 1 | V | UV dyes, optical brighteners, |
| 2 | V | luminescent dyes |
| 3 | VI | |
| 1 | VI | Antifoggants and stabilizers |
| 2 | VI | |
| 3 | VII | |
| 1 | VIII | Absorbing and scattering |

-continued

| Reference | Section | Subject Matter |
|---|---|---|
| 2 | VIII, XIII, XVI | materials; Antistatic layers; matting agents |
| 3 | VIII, IX C & D | |
| 1 | VII | Image-couplers and image- |
| 2 | VII | modifying couplers; Dye |
| 3 | X | stabilizers and hue modifiers |
| 1 | XVII | Supports |
| 2 | XVII | |
| 3 | XV | |
| 3 | XI | Specific layer arrangements |
| 3 | XII, XIII | Negative working emulsions; Direct positive emulsions |
| 2 | XVIII | Exposure |
| 3 | XVI | |
| 1 | XIX, XX | Chemical processing; |
| 2 | XIX, XX, XXII | Developing agents |
| 3 | XVIII, XIX, XX | |
| 3 | XIV | Scanning and digital processing procedures |

The photographic elements can be exposed with various forms of energy which encompass the ultraviolet, visible, and infrared regions of the electromagnetic spectrum, as well as with electron beam, beta radiation, gamma radiation, X rays, alpha particle, neutron radiation, and other forms of corpuscular and wave-like radiant energy in either noncoherent (random phase) forms or coherent (in phase) forms, as produced by lasers. When the photographic elements are intended to be exposed by X rays, they can include features found in conventional radiographic elements.

The photographic elements are preferably exposed to actinic radiation, typically in the visible region of the spectrum, to form a latent image, and then processed to form a visible image, preferably by other than heat treatment. Processing is preferably carried out in the known RA-4™ (Eastman Kodak Company) Process or other processing systems suitable for developing high chloride emulsions.

The following examples illustrate the practice of this invention. They are not intended to be exhaustive of all possible variations of the invention. Parts and percentages are by weight unless otherwise indicated.

EXAMPLES

Example 1

In this example two imaging supports were constructed by laminating biaxially oriented polyolefin sheets to a photographic grade cellulose paper with an MSA of +3 degrees from the MD. The first support utilized top and bottom biaxially oriented sheets that had an MSA of ±2 degrees. The second support utilized top and bottom biaxially oriented sheets that had an MSA of ±9 degrees. This example will show that the sample utilizing an MSA of ±2 degrees had no evidence of diagonal curl, while the second sample that utilized biaxially oriented sheets with an MSA of ±9 degrees had undesirable diagonal curl.

Photographic Grade Cellulose Paper

A photographic paper support was produced by refining a pulp furnish of 50% bleached hardwood kraft, 25% bleached hardwood sulfite, and 25% bleached softwood sulfite through a double disk refiner, then a Jordan conical refiner to a Canadian Standard Freeness of 200 cc. To the resulting pulp furnish was added 0.2% alkyl ketene dimer, 1.0% cationic cornstarch, 0.5% polyamide-epichlorohydrin, 0.26 anionic polyacrylamide, and 5.0% $TiO_2$ on a dry weight basis. An about 225 g/m$^2$ bone dry weight base paper was made on a fourdrinier paper machine, wet pressed to a solid of 42%, and dried to a moisture of 10% using steam-heated dryers achieving a Sheffield Porosity of 160 Sheffield Units and an apparent density 0.70 g/cc. The paper base was then surface sized using a vertical size press with a 10% hydroxyethylated cornstarch solution to achieve a loading of 3.3 wt. % starch. The surface sized support was calendered to an apparent density of 1.04 gm/cc. The base paper for both Examples 1 and 2 was 0.142 mm thick with an MD Modulus of 6205 MPa and an MD to CD modulus ratio of 1.89 and MSA angle of +3 degrees from the MD.

Sample 1 Top Biaxially Oriented Sheet (Invention)

A composite sheet (0.0356 mm thick, d=0.70 g/cc), consisting of a microvoided and oriented polypropylene core; CD (Cross Direction) Modulus of 2758 MPa and CD to MD modulus ratio of 1.85, an MSA angle of −2 degrees from the CD. The composite sheet consisted of 5 layers identified as L1, L2, L3, L4, and L5. L1 is the thin colored layer on the top of the support to which the photosensitive silver halide layer was attached. L2 is the layer to which optical brightener and $TiO_2$ was added. The optical brightener used was Hostalux KS manufactured by Ciba-Geigy. The rutile $TiO_2$ used was DuPont R104 (a 0.22 μm particle size $TiO_2$). L3 was a microvoided layer of polypropylene. L4 and L5 were solid polypropylene.

Sample 1 Bottom Sheet (Invention)

A solid sheet 0.0178 mm thick of oriented polypropylene with CD Modulus of 4000 MPa and CD to MD modulus ratio of 1.85, a MSA angle of +2 degrees from the CD. The bottom biaxially oriented sheet laminated to the backside of photographic paper base was a one-side matte finish, one-side treated biaxially oriented polypropylene sheet (25.6 μm thick) (d=0.90 g/cc) consisting of a solid oriented polypropylene layer and a skin layer of a block copolymer of polyethylene, and a terpolymer comprising ethylene, propylene, and butylene. The skin layer was on the bottom and the polypropylene layer was laminated to the paper.

Sample 2 Top Biaxially Oriented Sheet (Control)

A composite sheet (0.0356 mm thick, d=0.70 g/cc), consisting of a microvoided and oriented polypropylene core; CD (Cross Direction) Modulus of 2758 MPa and CD to MD modulus ratio of 1.85, a MSA angle of −8.5 degrees from the CD. The composite sheet consisted of 5 layers identified as L1, L2, L3, L4, and L5. L1 is the thin colored layer on the top of the support to which the photosensitive silver halide layer was attached. L2 is the layer to which optical brightener and $TiO_2$ was added. The optical brightener used was Hostalux KS manufactured by Ciba-Geigy. The rutile $TiO_2$ used was DuPont R104 (a 0.22 μm particle size $TiO_2$). L3 was a microvoided layer of polypropylene. L4 and L5 were solid polypropylene.

Sample 2 Bottom Biaxially Oriented Sheet (Control)

A solid sheet 0.0178 mm thick of oriented polypropylene with CD Modulus of 4000 MPa and CD to MD modulus ratio of 1.85, a MSA angle of −9.2 degrees from the CD. The bottom biaxially oriented sheet laminated to the backside of photographic paper base was a one-side matte finish, one-side treated biaxially oriented polypropylene sheet (25.6 μm thick) (d=0.90 g/cc) consisting of a solid oriented polypropylene layer and a skin layer of a block copolymer of polyethylene, and a terpolymer comprising ethylene, propylene, and butylene. The skin layer was on the bottom and the polypropylene layer was laminated to the paper.

Melt extruded adhesive tie layers were used to attach the sheets to the base paper, and each thickness was 0.0114 mm.

The tie layers did not have a high Modulus compared to the sheets or base paper, but the spacing must be accounted for when designing the package because the location of the oriented polypropylene sheets with respect to the base paper can change the overall stiffness. The top and bottom sheets were melt extrusion laminated to the above cellulose paper base using a metallocene catalyzed ethylene plastomer (SLP 9087) manufactured by Exxon Chemical Corp. The metallocene catalyzed ethylene plastomer had a density of 0.8900 g/cc and a melt index of 12.5.

Both samples 1 and 2 were coated with formnat 1 below:

| Coating Format 1 | Laydown mg/$m^2$ |
|---|---|
| Layer 1 Blue Sensitive Layer | |
| Gelatin | 1300 |
| Blue sensitive silver | 200 |
| Y-1 | 440 |
| ST-1 | 440 |
| S-1 | 190 |
| Layer 2 Interlayer | |
| Gelatin | 650 |
| SC-1 | 55 |
| S-1 | 160 |
| Layer 3 Green Sensitive | |
| Gelatin | 1100 |
| Green sensitive silver | 70 |
| M-1 | 270 |
| S-1 | 75 |
| S-2 | 32 |
| ST-2 | 20 |
| ST-3 | 165 |
| ST-4 | 530 |
| Layer 4 UV Interlayer | |
| Gelatin | 635 |
| UV-1 | 30 |
| UV-2 | 160 |
| SC-1 | 50 |
| S-3 | 30 |
| S-1 | 30 |
| Layer 5 Red Sensitive Layer | |
| Gelatin | 1200 |
| Red sensitive silver | 170 |
| C-1 | 365 |
| S-1 | 360 |
| UV-2 | 235 |
| S-4 | 30 |
| SC-1 | 3 |
| Layer 6 UV Overcoat | |
| Gelatin | 440 |
| UV-1 | 20 |
| UV-2 | 110 |
| SC-1 | 30 |
| S-3 | 20 |
| S-1 | 20 |
| Layer 7 SOC | |
| Gelatin | 490 |
| SC-1 | 17 |
| $SiO_2$ | 200 |
| Surfactant | 2 |

APPENDIX

Y-1

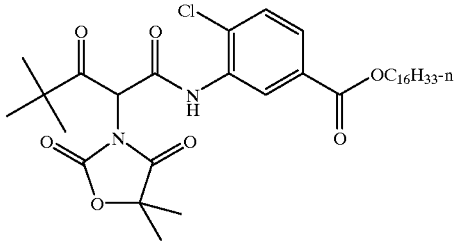

St-1=tert-butylarcrylamide/n-butyl acrylate copolymer (50:50)

S-1=dibutyl phthalate

SC-1

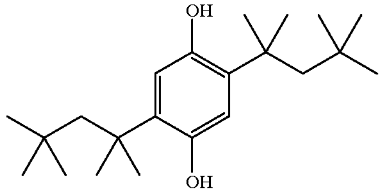

M-1

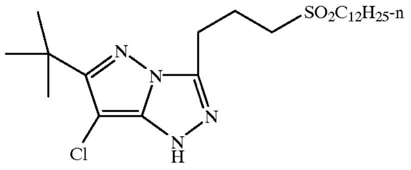

S-2=diundecyl phthalate

ST-2

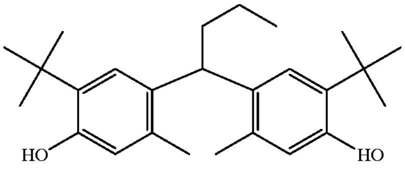

ST-3

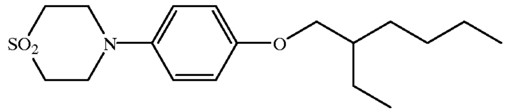

ST-4

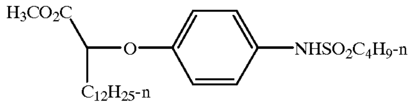

UV-1

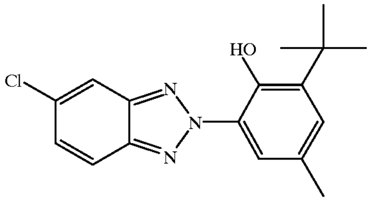

-continued

UV-2

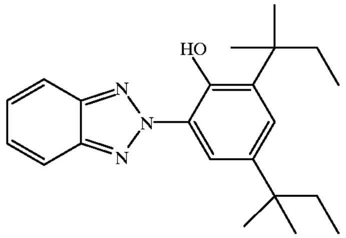

S-3=1,4-Cyclohexyldimethylene bis(2-ethylhexanoate)

C-1

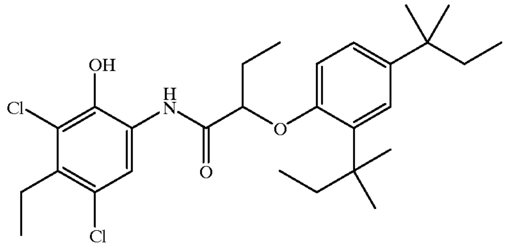

S-4=2-(2-Butoxyethoxy)ethyl acetate

Dye 1

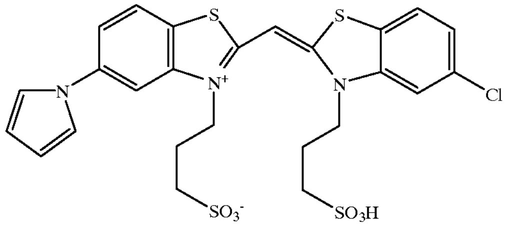

Four samples were taken for both sample 1 and sample 2 above and were measured for bending stiffness at 59% RH and 10 degree increments and plotted for a total of 360 degrees. The bending stiffness was rated by using the LORENTZEN & WETTRE STIFFNESS TESTER, MODEL 16D. The output from this instrument is the force, in millinewtons, required to bend the cantilevered, unclamped end of a sample 20 mm long and 38.1 mm wide at an angle of 15 degrees from the unloaded position.

The stiffness results for sample 1 were plotted on the polar stiffness graph. After equilibrating sample 1 to 20% RH, the presence or absence of significant "twist warp" was noted.

The plot is the plot of stiffness measured every 15 degrees. The polar plot of stiffness above clearly showed generally uniform stiffness over the entire 360 degrees tested; that is, stiffness in any direction is approximately equal. The stiffness at 50 and 130 degrees was statistically the same, and sample 1 did not have a uniquely weak condition. It has been found that uniform stiffness of the imaging element over 360 degrees yields an image that does not have "twist warp". Visual inspection of sample 1 did not show any evidence of "twist warp".

The stiffness results for sample 2 was plotted on the polar stiffness graph. After equilibrating sample 2 to 20% RH, the presence or absence of significant "twist warp" was noted.

The plot is the plot of stiffness measured every 15 degrees. The polar plot of stiffness clearly showed that sample 1 had a uniquely weak direction at 130 degrees. The weakest direction at 130 degrees was also much lower in stiffness than that of either the CD located at 90 degrees or MD located at 0 degrees. It has been found that non-uniform stiffness of the imaging element over 360 degrees yields an image that does have diagonal curl. Visual inspection of sample 2 did show objectionable diagonal curl of the image.

When comparing sample 1 (invention) to sample 2 (control), the significant difference was the magnitude of the MSA. Sample 1 utilized biaxially oriented sheets with an MSA less than ±3 degrees and did not exhibit any diagonal image curl. Sample 2 utilized biaxially oriented sheets with an MSA of ±9 degrees which is common to many typical biaxially oriented sheets used in packaging applications. Sample 2 had undesirable diagonal curl which would reduce the commercial value of an image.

The invention has been described in detail with particular reference to certain preferred embodiments thereof, but it will be understood that variations and modifications can be effected within the spirit and scope of the invention.

What is claimed is:

1. An imaging element base comprising at least two webs wherein the strongest direction of each web is within 3 degrees of machine direction or cross direction, and wherein each web has a machine direction to cross machine direction stiffness ratio of greater than 1.5 or less than 0.7 wherein said at least two webs comprise an upper and lower biaxially oriented polymer sheet and a middle web selected from the group consisting of paper, cloth, woven polymer fibers, and microvoided polyethylene terephthalate.

2. The imaging element base of claim 1 wherein said at least two webs form the support for said imaging element.

3. The imaging element base of claim 1 wherein at least one of said webs comprises a biaxially oriented polymer sheet.

4. The imaging element base of claim 1 wherein said at least two webs comprise two sheets of biaxially oriented polyolefin sheet.

5. The imaging element base of claim 4 wherein said at least two webs comprises paper.

6. The imaging element base of claim 1 wherein said at least two webs comprise an upper and lower biaxially oriented polyolefin sheet and a middle cellulose fiber paper web.

7. The imaging element base of claim 1 wherein said webs are adhesively joined.

8. The imaging element base of claim 1 wherein at least one of said webs comprises a polyester sheet.

9. The imaging element base of claim 1 wherein each of said at least two webs comprises biaxially oriented polyolefin sheet.

10. A photographic element comprising at least silver halide photosensitive containing layer and an imaging element base comprising at least two webs wherein the strongest direction of each web is within 3 degrees of machine direction or cross direction, and wherein each web has a machine direction to cross machine direction stiffness ratio of greater than 1.5 or less than 0.7 wherein said at least two webs comprise an upper and lower biaxially oriented polymer sheet and a middle web selected from the group consisting of paper, cloth, woven polymer fibers, and microvoided polyethylene terephthalate.

11. The photographic element base of claim 10 wherein at least one of said webs comprises a biaxially oriented polymer sheet.

12. The photographic element base of claim 10 wherein at least two of said at least two webs comprise two sheets of biaxially oriented polyolefin sheet.

13. The photographic element base of claim 12 wherein at least one of said at least two webs comprises paper.

14. The photographic element base of claim 10 wherein said at least two webs comprise an upper and lower biaxially oriented polyolefin sheet and a middle cellulose fiber paper web.

15. The photographic element base of claim 10 wherein said at least two webs are adhesively joined.

16. The photographic element base of claim 10 wherein at least one of said webs comprises a polyester sheet.

17. The photographic element of claim 13 further comprising dye forming couplers in said at least one photosensitive silver halide layer.

18. The imaging element of claim 1 further comprising a thermal dye receiving layer.

19. The imaging member of claim 1 further comprising an ink jet dye receiving layer.

20. The imaging member of claim 1 wherein said lower polymer sheet is selected from the group consisting of polyolefins, polyesters, polyamides, polycarbonates, cellulosic esters, polystyrene, polyvinyl resins, polysulfonamides, polyethers, polyimides, polyvinylidene fluoride, polyurethanes, polyphenylenesulfides, polytetrafluoroethylene, polyacetals, polysulfonates, polyester ionomers, polyolefin ionomers, and mixtures thereof.

21. The photographic element of claim 10 wherein said lower polymer sheet is selected from the group consisting of polyolefins, polyesters, polyamides, polycarbonates, cellulosic esters, polystyrene, polyvinyl resins, polysulfonamides, polyethers, polyimides, polyvinylidene fluoride, polyurethanes, polyphenylenesulfides, polytetrafluoroethylene, polyacetals, polysulfonates, polyester ionomers, polyolefin ionomers, and mixtures thereof.

22. The imaging element of claim 1 wherein middle web comprises cellulose fiber paper.

23. The imaging element of claim 10 wherein said middle web comprises cellulose fiber paper.

* * * * *